Patented Apr. 21, 1925.

1,534,236

UNITED STATES PATENT OFFICE.

EMERIC MARKÓCZI AND STEPHEN J. ADAM, OF BUDAPEST, HUNGARY, ASSIGNORS OF ONE-HALF TO FELIX R. WIESNER AND HUGO MECHWART, BOTH OF BUDAPEST, HUNGARY.

INDUSTRIAL UTILIZATION OF STRAWLIKE MATERIALS.

No Drawing. Application filed November 7, 1922. Serial No. 599,598.

*To all whom it may concern:*

Be it known that we, EMERIC MARKÓCZI, a citizen of Hungary, residing at Budapest, and STEPHEN J. ADAM, a citizen of Hungary, residing at Budapest, Hungary, have invented certain new and useful Improvements in Industrial Utilization of Strawlike Materials (for which we filed an application in Hungary on April 14, 1922), of which the following is a specification.

The subject of this invention is the process by means of which also cheap varieties of paper for the mass-consumption may be lucratively manufactured from straw-like materials.

Under the denomination of "straw-like materials" are to be understood: first, the straw of maize, wheat, rye, barley, oats, rice, millet, buckwheat, Siberian knot-grass, rape, clover, lucerne, vetch, saintfoin, bean, pea and lentil, the leafy stalks of the hop and nettle, the sugar-cane after being pressed out, the esparto, and besides these, in general, the leafy stalks of plants belonging to the family of the Typhaceæ, Gramineæ, Cyperaceæ, Juncaceæ and Urticaceæ and other similar materials.

From the point of view of the papermaker the main differences between these straw-like materials and the spruce or pine wood at present mostly used for the manufacture of varieties of paper for mass-consumption, are as follows:

*a.* The straw-like materials are of much looser and more inhomogeneous structure than the spruce of pine wood;

*b.* The straw-like materials contain—contrary to the spruce or pine wood—besides the cellulose a considerable amount of silicates and other compounds of very different degrees of solubility;

*c.* The straw-like materials contain besides the bast-fibres (libriform cells) which are especially suitable for paper-making, a considerable amount of inferior types of cells (parenchima, sklerenchima-cells, vessels) whereas the stock of cells of the spruce or pine wood mainly consists of uniform cells of tracheids equally suitable for papermaking;

*d.* As a rule, the ratio of the cross-section of the cell to the length of the cell is, in the case of the bast-cells of the straw-like materials, considerably smaller than in the case of the tracheids of the spruce or pine wood, so that the former represents a comparatively thinner and more flexible, but also more delicate sort of element for paper-making and more easily matted than the latter.

One fault of the present processes of making paper from straw-like materials, is that they do not sufficiently take into consideration the differences mentioned above. This is the reason that the manufacture of cheap varieties of paper for mass-consumption, from the straw-like materials enumerated above, does not prove lucrative with the present processes.

According to the new process the straw-like material to be converted, is first to be broken (crushed) in such a way that, by means of pressure (crushing), bending and torsion, it is disintegrated to a certain extent, and compressed at the same time and then chopped up into chaff by cutting, shearing or tearing. At the same time the material is separated by selection, connected with the above operation, from the rough contaminations which are detrimental to paper-making.

After this, the purified chaff,—in a wet condition,—undergoes a natural souring, which is artificially accelerated by caloric means. Under the term "natural souring" a mixed self-fermentation is understood, of the same nature as that which occurs in the sweet ensilage of the turnip-slices, green fodder, maize-straw, etc., which is customary in agriculture and is initiated and developed by different fermenting bacteria, (schizomycetes of the lactic, buturic, propionic, etc. fermentation), these bacteria being present also on the material itself. The acceleration of the souring is performed by heating, in such a way that the wet chaff compressed into the souring space, is heated up, immediately at the beginning, to the temperature most advantageous for the fermentation (100–125° F.), and the same temperature is maintained during the whole course of the souring process.

According to the invention the waste heat of the exhaust-steam or of the condensation water, obtained in the ordinary pulp- or paper-mill work, may be used for the above purpose, in such a way that the apparatus serving for the condensation of the exhaust-steam, or the apparatus serving for cooling the condensation water, contains also the space necessary for the souring (fermentation) of the wet chaff, the liberated heat of the condensed exhaust-steam or the heat of the condensation water being thus transmitted to the wet chaff.

The duration and the degree of souring (fermentation) may be different, according to the quality of the material to be converted and of the paper to be manufactured.

The chaff fermented in the above manner, is then cooked in a closed space (boiler or digester), at temperatures greater than 212° F., that is under pressure, first with water, then with an excess of alkali, until the required degree of digestion of the fibrous material (pulp) is attained. According to the invention the temperature, and so also the pressure, in the cooking space (boiler or digester) in both of the cooking processes, and besides this the concentration of alkali in the alkaline cooking are, during the whole cooking period, either gradually or continually increased. The increase of the temperature (pressure) and of the concentration of the alkali during the cooking (digestion) has, first of all, the advantage that everyone of the intercellular and incrusting materials contained in the chaff and soluble at different temperatures (pressures) and at different concentrations of alkali, can be extracted at the suitable temperature (pressure) and degree of concentration of alkali, by which means a superfluous waste of heat and alkali is prevented. The other advantage is that at the comparatively low average temperature (pressure) and concentration of alkali, the hydration of the inferior types of cells occurs in but a slight degree, so that the presence of even a greater amount of these types of cells in the paper, does not render it transparent. The limits between which the increasing of the temperature (pressure) and of the concentration of alkali takes place, vary accordingly to the quality of the material to be converted and of the paper to be manufactured.

By the previous souring (fermentation) a twofold object is attained, i. e., on the one hand, the digestion (loosening) of the fibrous material to a certain extent, on the other hand an increase in the degree of compressibility of the chaff. In consequence of this, the cooking (digestion) of the chaff as described above, may be performed in a smaller digester space, in a shorter time and at the expense of less heat and alkali than would be the case, had the chaff not been fermented previously.

In another form of the invention the cooking (digesting) of the fermented chaff either with water or with alkali or with both, is performed in the manner described above but in several boilers (digesters) simultaneously, these boilers being connected in such a way, as to enable the digesting liquor let into one of them to pass through the chaff into any other boiler or which is the same, on to the chaff contained therein. The cooking is performed, according to the well-known principle of the counter-current; in such a way that the unused, pure water or the fresh solution of alkali is let on to a chaff already severally cooked with the same kind of digesting liquor; from here it passes into a boiler containing a chaff that has been cooked one time less than the chaff in the boiler which it has just left, and so on, until the weak acid, or alkaline solution, containing an ever-increasing amount of the materials extracted from the chaff, runs onto a chaff which has not yet been cooked with water or with alkali. This latter solution is finally let out after the cooking (digesting) has been finished. This procedure, well-known in itself, is carried out, according to the invention, in such a way that the digesting liquor streams from one boiler into the other, in succession as described above, also during the cooking operation and that this streaming is partly caused by the fact that in the several boilers—succeeding each other in the direction of the streaming,—a gradually lower average pressure (temperature) is maintained.

By this arrangement a further considerable diminution of fuel and alkali consumption is attained, in addition to which the weak acid and the alkaline liquors obtained after the cooking has been finished, may thus be made the solutions of that greatest concentration of the extractives (intercellular and incrusting materials), which can be at all obtained by cooking the chaff with water and afterwards with alkali. This is rendered possible without the necessity of interrupting the cooking, and subjecting the wet chaff, more than once, to pressing, wringing or similar expensive operations, if the extracted materials are, by condensing their solutions by evaporation, to be utilized as a by-product in the form of artificial fodder, vegetable glue etc.

In the latter case the process changes in such a way that the two solutions of the extracted materials obtained by the cooking with water and with alkali, are already united in the cooking space (boiler) during the cooking operation, and this united liquor which contains all the extractives, is after its removal from the digested fibrous material, condensed by evaporation to a syrup-like by-product. Before the condensation of the liquor its eventual acidity or alkalinity is, if necessary, neutralized.

This by-product may increase the lucrativeness of the process considerably, since the liquor to be condensed, in consequence of the above described cooking procedure, can be, on the one hand, a solution of the greatest possible concentration and on the other hand it represents a wash of comparatively slight alkalinity (acidity) or a weak solution of salts, so that the condensation can be performed with a comparatively no great consumption of heat, and the syrup-like material produced, represents, without additional treatment, a useful by-product.

The digested fibrous material forming a raw pulp suitable for paper-making, is washed (rinsed) with water in the well-known manner.

Both the rough and fine beating of the digested fibrous material may be done by means of beating tools made of wood, india-rubber, horn, leather or other similar soft, but tough and elastic material. The form of the beating tools and the arrangement of the beaters may be similar to those used at the present time in ordinary pulp- or paper-mill work. By adopting these kinds of beating tools the result can be obtained that the pulp, of which the most valuable elements are the comparatively thin bast-cells (libriform cells), is not exposed to the danger of overbeating even in the case of an effective beating when the tools are adjusted very closely to each other.

In order to prevent an unnecessary waste of the beaten pulp, use must be made, both in the draining operations and in the dipping, of finer sieves (of a higher number) and finer draining bottoms than those used in the manufacture of paper from rags or spruce (pine wood).

According to the invention a further diminution of the pulp waste may be attained by using repeatedly the waste water of the washing (rinsing) and beating operations, as well as that of the sand trap and of the fine sorting apparatus, and that of the bleaching operation, for the same operations with a fresh charge of pulp. This is effected in such a way that the chemically determinable alkali or acid collected in the water during its repeated use, is neutralized in a way that does not affect the quality of the pulp. The repeated use of the waste water can only be continued so long as the waste-stuff collected in the water and the salts derived from the neutralization, do not injuriously affect the quality of the paper to be produced.

According to this principle the alkaline waste water of the first washing and rough beating can be utilized in preparing a fresh solution of alkali for a fresh charge of chaff.

Otherwise the conversion of the digested fibrous material into paper is performed after the well-known processes and by means of the machinery at present in use.

Having thus described our invention what we claim to be new and useful is:

1. The process of the industrial utilization of straw-like materials, which consists in crushing the material by pressure, bending, and torsion, chopping it into a chaff, then subjecting the chaff, in a wet condition, to a natural souring (self-fermentation) accelerated by transmitting to the chaff the waste heat of the exhaust steam or the heat of the condensation water of the steam plant, cooking (digesting) the fermented chaff simultaneously in several communicating boilers (closed cooking spaces) at temperatures exceeding 212° F., at first with water, then with an excess of alkali, increasing the temperature (pressure) in the boilers in both cookings during the whole cooking operation, increasing the concentration of the alkali during the whole alkaline cooking, passing the digesting liquor, during the cooking, through the series of the boilers connected with each other, maintaining gradually lower average pressures (temperatures) in the several boilers succeeding each other in the direction of the moving liquor, uniting the two solutions of the extracted materials, obtained by the cooking with water and with alkali, this uniting being performed in the cooking space already during the cooking operation, removing the united liquor from the digested fibrous material, and condensing it by evaporation to a syrup-like material, washing and beating the digested fibrous material (raw pulp) by means of beating tools made of wood, india-rubber, horn, leather or other similar soft, but tough and elastic material, sorting and bleaching the beaten pulp, repeatedly using the waste-water of the washing, beating sorting and bleaching, for the same operation with fresh charges of pulp, neutralizing the alkali or acid collected in the repeatedly used waste-water, preparing the alkaline liquor for the cooking of a new charge of fermented chaff, from the alkaline waste-water of the first washing and beating of the raw pulp, making paper from the bleached pulp in the customary way, substantially as described.

2. The process of the industrial utilization of straw-like materials, which consists in crushing the material and chopping it into chaff, then subjecting the chaff, in a wet condition, to a natural souring (self-fermentation) accelerated by the application of heat, cooking (digesting) the fermented chaff in a closed space (boiler or digester) at temperatures exceeding 212° F., at first with water, then with an excess of alkali, increasing the temperature (pressure) in the boiler (digester) in both cookings during the whole cooking operation, increasing the concentration of the alkali during the whole alkaline cooking washing and beating the digested fibrous material (raw-pulp) by means of beating tools made of wood, india-rubber, horn, leather or other similar soft, but tough and elastic material, making paper from the beaten pulp in the customary way, substantially as described.

3. The process of the industrial utilization of straw-like materials, which consists in crushing the material and chopping it into a chaff, then subjecting the chaff, in wet condition, to a natural souring (self-fermentation) accelerated by transmitting to the chaff the waste heat of the exhaust-steam or the heat of the condensation water of the steam plant, cooking (digesting) the fermented chaff in a closed space (boiler or digester) at temperatures exceeding 212° F., at first with water, then with an excess of alkali, increasing the temperature (pressure) in the boiler (digester) in both cookings during the whole cooking operation, increasing the concentration of the alkali during the whole alkaline cooking, washing and beating the digested fibrous material (raw-pulp) by means of beating tools made of wood, india-rubber, horn, leather or other similar soft, but tough and elastic material, making paper from the beaten pulp in the customary way, substantially as described.

4. The process of the industrial utilization of straw-like materials, which consists in crushing the material and chopping it into a chaff, then subjecting the chaff in a wet condition to a natural souring (self-fermentation) accelerated by the application of heat, cooking (digesting) the fermented chaff in a closed space (boiler or digester) at temperatures exceeding 212° F., at first with water, then with an excess of alkali, increasing the temperature (pressure) in the boiler (digester) in both cookings during the whole cooking operation, increasing the concentration of the alkali during the whole alkaline cooking, washing and beating the digested fibrous material (raw pulp) by means of beating tools made of wood, india-rubber, horn, leather or other soft, but tough and elastic material, sorting and bleaching the beaten pulp, repeatedly using the waste-water of the washing, beating, sorting and bleaching for the same operation with fresh charges of pulp, neutralizing the alkali or acid collected in the repeatedly used waste-water, preparing the alkaline digesting liquor for the cooking of a new charge of fermented chaff, from the alkaline waste-water of the first washing and beating of the raw pulp, making paper from the bleached pulp in the customary way, substantially as described.

5. The process of the industrial utilizing of straw-like materials, which consists in crushing the material and chopping it into a chaff, then subjecting the chaff, in a wet condition, to a natural souring (self-fermentation) accelerated by transmitting to the chaff the waste heat of the exhaust-steam or the heat of the condensation water of the steam plant, cooking (digesting) the fermented chaff in a closed space (boiler or digester) at temperatures exceeding 212° F. at first with water, then with an excess of alkali, increasing the temperature (pressure) in the boiler (digester) in both cookings during the whole cooking operation, increasing the concentration of the alkali during the whole alkaline cooking, washing and beating the digested fibrous material (raw pulp) by means of beating tools made of wood, india-rubber, horn, leather or other similar soft, but tough and elastic material, sorting and bleaching the beaten pulp, repeatedly using the waste-water of the washing, beating, sorting and bleaching for the same operation with fresh charges of pulp, neutralizing the alkali or acid collected in the repeatedly used waste-water preparing the alkaline digesting liquor for the cooking of a new charge of fermented chaff, from the alkaline waste-water of the first washing and beating of the raw pulp, making paper from the bleached pulp in the customary way, substantially as described.

6. The process of the industrial utilization of straw-like materials, which consists in crushing the material and chopping into a chaff, then subjecting the chaff in a wet condition, to a natural souring (self-fermentation) accelerated by the application of heat, cooking (digesting) the fermented chaff in a close-space (boiler or digester) at temperatures exceeding 212° F., at first with water, then with an excess of alkali, increasing the temperature (pressure) in the boiler (digester) both cookings during the whole cooking operation, increasing the concentration of the alkali during the whole alkaline cooking, uniting the two solutions of the extracted materials, obtained by the cooking with water and with alkali, this uniting being performed in the cooking space already during the cooking operation, removing the united liquor from the digested fibrous material and condensing it by evaporation to a syrup-like material, substantially as described.

7. The process of the industrial utilization of straw-like materials, which consists in crushing the material and chopping it into a chaff, then subjecting it in a wet condition to a natural souring (self-fermentation) accelerated by transmitting to the chaff the waste heat of the exhaust-steam or the heat of the condensation water of the steam plant, cooking (digesting) the fermented chaff in a close space (boiler or digester) at temperatures exceeding 212° F., at first with water, then with an excess with alkali, increasing the temperature (pressure) in the boiler (digester) in both cookings during the whole cooking operation, increasing the concentration of the alkali during the whole alkaline cooking, uniting the two solutions of the extracted material, obtained by the cooking with water and with alkali, this uniting being performed in the cooking space already during the cooking operation, removing the united liquor from the digested fibrous material, and condensing it by evaporation to a syrup-like material, substantially as described.

8. The process of the industrial utilization of straw-like materials, which consists in crushing the material and chopping it into a chaff, then subjecting the chaff, in a wet condition, to a natural souring (self-fermentation) accelerated by the application of heat, cooking (digesting) the fermented chaff in a close space (boiler or digester) at temperatures exceeding 212° F., at first with water, then with an excess of alkali, increasing the temperature (pressure) in the boiler (digester) in both cookings during the whole cooking operation, increasing the concentration of the alkali during the whole alkaline-cooking, uniting the two solutions of the extracted material, obtained by the cooking with water and with alkali, this uniting being performed in the cooking space already during the cooking operation, removing the united liquor from the digested chaff, and condensing it by evaporation to a syrup-like material, washing and beating the digested fibrous material (raw pulp), preparing the alkaline digesting liquor for the cooking of a new charge of fermented chaff, from the alkaline waste-water of the first washing and beating of the raw pulp, substantially as described.

9. The process of the industrial utilization of straw-like materials, which consists in crushing the material and chopping it into a chaff, then subjecting the chaff in a wet condition to a natural souring (self-fermentation) accelerated by transmitting to the chaff the waste heat of the exhaust-steam or the heat of the condensation water of the steam plant, cooking (digesting) the fermented chaff in a close space (boiler or digester) at temperatures exceeding 212° F., at first with water, then with an excess of alkali, increasing the temperature (pressure) in the boiler (digester) in both cookings during the whole cooking operation, increasing the concentration of the alkali during the whole alkaline cooking, uniting the two solutions of the extracted materials, obtained by the cooking with water and with alkali, this uniting being performed in the cooking space already during the cooking operation, removing the united liquor from the digested fibrous material and condensing it by evaporation to a syrup-like material, washing and beating the digested fibrous material (raw pulp), preparing the alkaline digesting liquor for the cooking of a new charge of fermented chaff from the waste-water of the first washing and beating of the raw pulp, substantially as described.

10. The process of the industrial utilization of straw-like materials which consists in crushing the material and chopping it into a chaff, then subjecting the chaff, in a wet condition, to a natural souring (self fermentation) accelerated by the application of heat, cooking (digesting) the fermented chaff simultaneously in several communicating boilers (closed cooking spaces), passing the digesting liquor, during the cooking, through the series of the boilers connected with each other, maintaining gradually lower average pressures (temperatures) in the several boilers succeeding each other in the direction of the moving liquor, washing and beating the digested fibrous material (raw pulp), making paper from the beaten pulp in the customary way, substantially as described.

11. The process of the industrial utilization of straw-like materials, which consists in crushing the material and chopping it into a chaff, then subjecting the chaff, in a wet condition, to a natural souring (self fermentation) accelerated by the application of heat, cooking (digesting) the fermented chaff simultaneously in several communicating boilers (closed cooking spaces) at temperatures exceeding 212° F., at first with water then with an excess of alkali, increasing the temperature (pressure) in the boilers in both cookings during the whole cooking operation, increasing the concentration of the alkali during the whole alkaline cooking, passing the digesting liquor, during the cooking, through the series of the boilers connected with each other, maintaining gradually lower average pressures (temperatures) in the several boilers succeeding each other in the direction of the moving liquor, washing and beating the digested fibrous material (raw pulp), making paper from the beaten pulp in the customary way, substantially as described.

12. The process of the industrial utilization of straw-like materials, which consists in crushing the material and chopping it into a chaff, then subjecting the chaff, in a wet condition, to a natural souring (self fermentation) accelerated by transmitting to the chaff the waste heat of the exhaust-steam or the heat of the condensation water of the steam plant, cooking (digesting) the fermented chaff simultaneously in several communicating boilers (closed cooking spaces) at temperatures exceeding 212° F., at first with water, then with an excess of alkali, increasing the temperature (pressure) in the boilers in both cookings during the whole cooking operation, increasing the concentration of the alkali during the whole alkaline cooking, passing the digesting liquor, during the cooking through the series of the boilers connected with each other, maintaining gradually lower average pressures (temperatures) in the several boilers succeeding each other in the direction of the moving liquor, washing and beating the digested fibrous material (raw pulp), making paper from the beaten pulp in the customary way, substantially as described.

13. The process of the industrial utilization of straw-like materials, which consists in crushing the material and chopping it into a chaff, then subjecting the chaff, in a wet condition, to a natural souring (self fermentation) accelerated by the application of that, cooking (digesting) the fermented chaff simultaneously in several communicating boilers (closed cooking spaces) at temperatures exceeding 212° F., at first with water, then with an excess of alkali, increasing the temperature (pressure) in the boilers in both cookings during the whole cooking operation, increasing the concentration of the alkali during the whole alkaline cooking, passing the digesting liquor, during the cooking, through the series of the boilers connected with each other, maintaining gradually lower average pressures (temperatures) in the boilers succeeding each other in the direction of the moving liquor, washing, beating, sorting and bleaching the digested fibrous material (raw pulp) repeatedly using the waste water of the washing, beating, sorting and bleaching, for the same operation with fresh charges of pulp, neutralizing the alkali or acid collected in the repeatedly used waste-water, preparing the alkaline digesting liquor for the cooking of a new charge of fermented chaff, from the alkaline waste water of the first washing and beating of the raw pulp making paper from the bleached pulp in the customary way, substantially as described.

14. The process of the industrial utilization of straw-like materials, which consists in crushing the material and chopping it into a chaff, then subjecting the chaff, in a wet condition, to a natural souring (self fermentation) accelerated by transmitting to the chaff the waste heat of the exhaust-steam or the heat of condensation water of the steam plant, cooking (digesting) the fermented chaff simultaneously in several communicating boilers (closed cooking spaces) at temperatures exceeding 212° F., at first with water, then with an excess of alkali, increasing the temperature (pressure) in the boilers in both cookings during the whole cooking operation, increasing the concentration of the alkali during the whole alkaline cooking, passing the digesting liquor, during the cooking through the series of the boilers connected with each other, maintaining gradually lower average pressures (temperatures) in the several boilers succeeding each other in the direction of the moving liquor, washing, beating, sorting and bleaching the digested fibrous material (pulp), repeatedly using the waste water of the washing, beating, sorting, and bleaching, for the same operation with fresh charges of pulp, neutralizing the alkali or acid collected in the repeatedly used waste-water, preparing the alkaline digesting liquor for the cooking of a new charge of fermented chaff, from the alkaline waste-water of the first washing and beating of the raw pulp, making paper from the bleached pulp in the customary way, substantially as described.

15. The process of the industrial utilization of straw-like materials, which consists in crushing the material and chopping it into a chaff, then subjecting the chaff, in a wet condition, to a natural souring (self-fermentation) accelerated by the application of heat, cooking (digesting) the fermented chaff simultaneously in several communicating boilers (closed cooking spaces) at temperatures exceeding 212° F., at first with water, then with an excess of alkali, increasing the temperature (pressure) in the boilers in both cookings during the whole cooking operation, increasing the concentration of the alkali during the whole alkaline cooking, passing the digesting liquor, during the cooking, through the series of the boilers connected with each other, maintaining gradually lower average pressures (temperatures) in the several boilers succeeding each other in the direction of the moving liquor, uniting the two solutions of the extracted materials, obtained by the cooking with water and with alkali, this uniting being performed in the cooking space already during the cooking operation, removing the united liquor from the digested fibrous material, and condensing it by evaporation to a syrup-like material, substantially as described.

16. The process of the industrial utilization of straw-like materials, which consists in crushing the material and chopping it into a chaff, then subjecting the chaff, in a wet condition, to a natural souring (self-fermentation) accelerated by transmitting to the chaff the waste heat of the exhaust steam or the heat of the condensation water of the steam plant, cooking (digesting) the fermented chaff simultaneously in several communicating boilers (closed cooking spaces) at temperatures exceeding 212° F., at first with water, then with an excess of alkali, increasing the temperature (pressure) in the boilers in both cookings during the whole cooking operation, increasing the concentration of the alkali during the whole alkaline cooking, passing the digesting liquor, during the cooking, through the series of the boilers connected with each other, maintaining gradually lower average pressures (temperatures) in the several boilers succeeding each other in the direction of the moving liquor, uniting the two solutions of the extracted materials, obtained by the cooking with water and with alkali, this uniting being performed in the cooking space already during the cooking operation, removing the united liquor from the digested fibrous material, and condensing it by evaporation to a syrup-like material, substantially as described.

17. The process of the industrial utilization of straw-like materials, which consists in crushing the material and chopping it into a chaff, then subjecting the chaff, in a wet condition, to a natural souring (self-fermentation) accelerated by the application of heat, cooking (digesting) the fermented chaff simultaneously in several communicating boilers (closed cooking spaces) at temperatures exceeding 212° F., at first with water, then with an excess of alkali, increasing the temperature (pressure) in the boilers in both cookings during the whole cooking operation, increasing the concentration of the alkali during the whole alkaline cooking, passing the digesting liquor, during the cooking, through the series of the boilers connected with each other, maintaining gradually lower average pressures (temperatures) in the several boilers succeeding each other in the direction of the moving liquor, uniting the two solutions of the extracted materials, obtained by the cooking with water and with alkali, this uniting being performed in the cooking space already during the cooking operation, removing the united liquor from the digested fibrous material, and condensing it by evaporation to a syrup-like material, washing and beating the digested fibrous material (raw pulp), preparing the alkaline digesting liquor for the cooking of a new charge of fermented chaff, from the alkaline waste-water of the first washing and beating of the raw pulp, substantially as described.

18. The process of the industrial utilization of straw-like materials, which consists in crushing the material and chopping it into a chaff, then subjecting the chaff, in a wet condition, to a natural souring (self-fermentation) accelerated by transmitting to the chaff the waste heat of the exhaust-steam or the heat of the condensation water of the steam plant, cooking (digesting) the fermented chaff simultaneously in several communicating boilers (closed cooking spaces) at temperatures exceeding 212° F., at first with water, then with an excess of alkali, increasing the temperature (pressure) in the boilers in both cookings during the whole cooking operation, increasing the concentration of the alkali during the whole alkaline cooking, passing the digesting liquor, during the cooking, through the series of the boilers connected with each other, maintaining gradually lower average pressures (temperatures) in the several boilers succeeding each other in the direction of the moving liquor, uniting the two solutions of the extracted materials, obtained by the cooking with water and with alkali, this uniting being performed in the cooking space already during the cooking operation, removing the united liquor from the digested fibrous material, and condensing it to a syrup-like material, washing and beating the digested material (raw pulp), preparing the alkaline digesting liquor for the cooking of a new charge of fermented chaff, from the alkaline waste-water of the first washing and beating of the raw pulp, substantially as described.

In testimony whereof we affix our signatures in presence of two witnesses.

EMERIC MARKÓCZI.
STEPHEN JOSEPH ADAM.

Witnesses:
  ALBERT PARKER,
  C. W. TERRELL.